United States Patent
Bernhardsson et al.

(10) Patent No.: US 7,583,760 B2
(45) Date of Patent: Sep. 1, 2009

(54) CALCULATION OF SOFT DECISION VALUES USING RELIABILITY INFORMATION OF THE AMPLITUDE

(75) Inventors: Bo Bernhardsson, Lund (SE); Bengt Lindoff, Bjärred (SE); Peter Malm, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 607 days.

(21) Appl. No.: 10/535,479

(22) PCT Filed: Oct. 9, 2003

(86) PCT No.: PCT/EP03/11230

§ 371 (c)(1),
(2), (4) Date: Oct. 21, 2005

(87) PCT Pub. No.: WO2004/049661

PCT Pub. Date: Jun. 10, 2004

(65) Prior Publication Data

US 2006/0126761 A1    Jun. 15, 2006

Related U.S. Application Data

(60) Provisional application No. 60/429,579, filed on Nov. 26, 2002.

(30) Foreign Application Priority Data

Nov. 22, 2002    (EP) .................................. 02388074

(51) Int. Cl.
*H03D 1/00* (2006.01)
*H03M 13/05* (2006.01)
(52) U.S. Cl. ..................................... 375/340; 714/793

(58) Field of Classification Search ................ 375/340, 375/261, 262, 341, 265; 714/759, 755, 786, 714/793
See application file for complete search history.

(56) References Cited

U.S. PATENT DOCUMENTS 5,214,675 A    5/1993    Mueller et al.

(Continued)

FOREIGN PATENT DOCUMENTS

EP    0887976    12/1998

(Continued)

OTHER PUBLICATIONS

John G. Proakis, "Digital Communications", McGraw-Hill, New York, NY., © 2001.

(Continued)

*Primary Examiner*—Khai Tran
(74) *Attorney, Agent, or Firm*—Michael Cameron (57) ABSTRACT

Method of, and arrangement and device for, decoding a communications signal in a digital communications system, where the communications signal is modulated according to a modulation scheme including amplitude information; generating a likelihood value for a received communications signal, decoding the communications signal based on at least the generated likelihood value, providing a reliability indication of the amplitude information conveyed by the received communications signal wherein the step of generating the likelihood value further comprises generating the likelihood value on the basis of the provided reliability indication of the amplitude information.

25 Claims, 4 Drawing Sheets

U.S. PATENT DOCUMENTS

| | | | |
|---|---|---|---|
| 5,271,042 A | | 12/1993 | Borth et al. |
| 5,566,191 A | * | 10/1996 | Ohnishi et al. .............. 714/794 |
| 6,529,559 B2 | * | 3/2003 | Reshef ....................... 375/262 |
| 2002/0015438 A1 | | 2/2002 | Ishizu et al. |

FOREIGN PATENT DOCUMENTS

| | | |
|---|---|---|
| EP | 1187340 | 3/2002 |
| JP | 2005014123 A | 1/1993 |
| JP | 2006006400 A | 1/1994 |
| JP | 2004104717 A | 4/2004 |

OTHER PUBLICATIONS

Nobuhiko Miki et al., "Multipath Interference Canceller Using Soft-decision Replica Combined with Hybird ARQ in W-CDMA Forward Link", IEEE, 2001, pp. 1922-1926.

* cited by examiner

CALCULATION OF SOFT DECISION VALUES USING RELIABILITY INFORMATION OF THE AMPLITUDE

The patent application claims the benefit of priority from U.S. Provisional Patent Application Ser. No. 60/429,579 filed on Nov. 26, 2002. This application incorporates by reference the entire disclosure of U.S. Provisional Patent Application Ser. No. 60/429,579.

FIELD OF THE INVENTION

This invention relates to digital communications systems and, more particularly, the generation of soft reliability values for multilevel signals.

BACKGROUND

Within the field of digital communications, multilevel modulation is used to map a number of bit sequences to a signal alphabet comprising a number of signal symbols, i.e. a number of points in signal space. For example, a bit sequence may be mapped onto a point in a complex signal space. A signal alphabet of size M allows $\log_2(M)$ bits to be mapped to each symbol. However, when symbols are received at a receiver, they may be affected by noise, thereby affecting the decoding of the signal when retrieving the transmitted bit sequence. If multilevel modulation is used in conjunction with channel coding, many channel decoders, such as iterative decoders based on the BCJR algorithm, require likelihood values for the received bits, so-called soft values, as an input. A soft value corresponds to a likelihood value of a single bit being 0 or 1.

Examples of multilevel modulation include multi-amplitude level modulation in Pulse Amplitude Modulation (PAM), multi signal point modulation in Quadrature Amplitude Modulation (QAM), or the like.

For example, an emerging technology for wideband digital radio communications of Internet, multimedia, video and other capacity-demanding applications in connection with the third generation of mobile telephone systems is the evolving Wideband Code Division Multiple Access (WCDMA) specified as part of the 3GPP standardisation organisation. Within this technology, High Speed Downlink Packet Access (HSDPA) is provided including a high speed downlink shared channel (HS-DSCH) which uses 16-QAM. In 16-QAM, M=16, i.e. each symbol in the signal alphabet represents 4 bits. Future releases may comprise even larger constellation sizes such as 64-QAM. Unlike QPSK, 16-QAM also includes amplitude information into the modulation.

However, in modulation schemes such as 16-QAM that include amplitude information in the modulation, it is a problem that the quality of the signal decoding is sensitive to amplitude distortions.

SUMMARY

The above and other problems are solved when a method of decoding a communications signal in a digital communications system, where the communications signal is modulated according to a modulation scheme including amplitude information; the method comprising generating a likelihood value for a received communications signal;

decoding the communications signal based on at least the generated likelihood value;

is characterised in that the method further comprises providing a reliability indication of the amplitude information conveyed by the received communications signal ; and that the step of generating the likelihood value further comprises generating the likelihood value on the basis of the provided reliability indication of the amplitude information.

Consequently, by providing reliability information about the amplitude information, and including this reliability information in the calculation of the likelihood values, reliable amplitude information may be distinguished from unreliable amplitude information, thereby increasing the accuracy of the calculated likelihood values and, thus, improving the quality of the signal decoding considerably.

It is a further advantage of the invention that the calculated likelihood values are less sensitive to amplitude distortions.

In one embodiment, the likelihood value is indicative of a likelihood that the received communications signal represents a bit sequence comprising a predetermined bit value at a predetermined position. Hence, preferably, a likelihood value is calculated for each bit of the transmitted bit sequence. In one embodiment, the likelihood values are soft values for use by a decoder based on soft values, e.g. a Viterbi decoder, turbo decoder, BCJR decoder, or the like.

According to a preferred embodiment of the invention, the method further comprises receiving the communications signal by a receiver module, and that the reliability indication is provided by the receiver module.

It has been realised by the inventors that reliability information about the amplitude information is often available at the receiver and, thus, may be utilised in the subsequent baseband processing. For instance, a gain change in the receiver may be induced by the terminal, e.g. in order to adjust for the signal strength. Such a gain change may not, or at least only partially, be correctable by the receiver due to calibration and synchronisation issues.

Hence, according to a further preferred embodiment of the invention, the step of receiving the communications signal further comprises scaling the communications signal by an amplifier and the step of providing the reliability indication comprises generating the reliability indication on the basis of a gain setting of said amplifier. Hence, by forwarding information about the occurred gain change from the receiver to the baseband processing, the baseband system may incorporate this information in the calculation of soft values, thereby providing an efficient handling of receiver introduced amplitude distortions, since reliable and unreliable values are distinguished.

It is a further advantage of the invention that it provides a simple and cost-effective method of reducing the effects of amplitude distortions, in particular receiver introduced amplitude distortions.

Preferably, the step of generating the likelihood value on the basis of the provided reliability indication comprises determining whether an amplitude change by a predetermined magnitude has occurred within a predetermined time period. Hence, a simple mechanism is provided for determining whether or not the amplitude information is regarded as reliable. This is particularly advantageous since in many situations a complete model of the amplitude distortion is not available. Furthermore, this algorithm allows for a simple and cost-effective implementation which does not require many computational resources. Here, the term amplitude change by a predetermined magnitude comprises an amplitude change that is larger than a predetermined threshold.

The adjustment of the receiver's gain due to a varying signal level may be larger than a predetermined threshold. For example, in a receiver where the amplifier gain may be changed between a number of discrete levels, an amplitude change by a predetermined magnitude may correspond to any change of amplifier gain settings or to a gain change which is larger than a predetermined threshold. Similarly, if the gain may be changed continuously or quasi-continuously, a change in amplitude by a predetermined magnitude may be detected as a gain change larger than a predetermined threshold.

Preferably, the predetermined time period corresponds to a time slot for communicating a bit sequence. Hence, it is detected whether a gain change has occurred during reception of a signal symbol representing a bit sequence. As such a gain change may cause amplitude distortions during reception of a signal symbol, the decoding of the corresponding bits of this symbol are less reliable.

In a further preferred embodiment, the step of generating the likelihood value on the basis of the provided reliability indication further comprises adjusting the likelihood value to a value corresponding to higher uncertainty of a predetermined bit value if an amplitude change has occurred and if said bit value is encoded using amplitude information. In many modulation schemes, e.g. in the 16-QAM scheme proposed for the above-mentioned HSDPA, not all bits of a signal symbol depend on amplitude information. Hence, by limiting the adjustment of likelihood values on the basis of amplitude information to those bits which actually depend on amplitude information, the efficiency of the system is increased without reducing the quality of decoding.

In one embodiment where a likelihood value of zero corresponds to maximum uncertainty, a likelihood value that is known to be affected by amplitude distortions may be adjusted such that its absolute value is reduced, e.g. the likelihood value may be set to zero.

Hence, in a yet further preferred embodiment, the modulation scheme is 16-QAM wherein each signal symbol comprises four bits and where two predetermined bits of said four bits depend on amplitude information; and the method comprises adjusting the likelihood values of said two predetermined bits to a value corresponding to higher uncertainty, if a change in amplitude is detected during the time slot for communicating said four bit sequence.

In many receivers a number of bit sequences, corresponding to a number of consecutive time slots, are decoded together.

Hence, in a preferred embodiment of the invention, the method further comprises rejecting all received signal symbols received within a time interval comprising a predetermined number of consecutive slots, if a change in amplitude by a predetermined magnitude is detected in more than a predetermined fraction of slots of said number of consecutive slots. Consequently, a number of signal symbols may be rejected as unreliable before the actual decoding stage, thereby speeding up the decoding process and, thus, increasing the throughput of the receiver.

In one embodiment of the invention, the method further comprises the step of providing the reliability value as an input to a decoder, e.g. an iterative decoder using the BCJR algorithm or any other decoder using soft values as an input. It is an advantage of the invention that it provides an accurate and resource-efficient soft-value approximation which results in soft values that are less sensitive to amplitude distortions.

The signal space may comprise one or more dimensions. For example, in QAM modulation two amplitude-modulated signals are transmitted on a single carrier, but shifted in phase by 90 degrees. Hence, the resulting signal points may be represented in the complex plane representing the so-called in-phase (I) and quadrature (Q) components of the QAM signal.

The present invention can be implemented in different ways including the method described above and in the following, an arrangement, and further product means, each yielding one or more of the benefits and advantages described in connection with the first-mentioned method, and each having one or more preferred embodiments corresponding to the preferred embodiments described in connection with the first-mentioned method and disclosed in the dependant claims.

It is noted that the features of the method described above and in the following may be implemented in software and carried out in a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

The invention further relates to an arrangement for decoding a communications signal in a digital communications system, where the communications signal is modulated according to a modulation scheme including amplitude information; the arrangement comprising processing means adapted to generate a likelihood value for a received communications signal;

a decoder for decoding the communications signal based on at least the generated likelihood value;

means for providing a reliability indication of the amplitude information conveyed by the received communications signal; and the processing means is further adapted to generate the likelihood value on the basis of the provided reliability indication of the amplitude information.

The term processing means comprises any suitable general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

The means for providing a reliability indication of the amplitude information conveyed by the received communications signal may comprise any suitable circuitry, processor, or the like, adapted to determine a suitable measure of reliability of the amplitude information and to generate a corresponding reliability indication, e.g. a reliability signal, or the like.

In a preferred embodiment of the invention, the arrangement comprises a receiver for receiving a communication signal;

an amplifier for scaling the received communications signal according to a predetermined amplifier gain;

a gain control module for controlling the amplifier gain according to a received signal strength, the gain control module being adapted to feed a gain control signal to the amplifier; and a control unit for generating amplitude information, the control unit being adapted to receive the gain control signal from the gain control unit and to generate an amplitude information signal; and the processing means is adapted to receive the amplitude information signal from the control unit.

The receiver, e.g. a radio receiver or the like, may comprise any suitable circuitry or device for receiving the communications signal.

In other embodiments the reliability information may be provided by other means, such as a detector for detecting amplitude variations in the transmission channel, or the like.

Further preferred embodiments of the arrangement according to the invention correspond to the preferred embodiments described in connection with the first-mentioned method and disclosed in the dependant claims.

The invention further relates to a device for receiving a communications signal comprising an arrangement as described above and in the following.

The device may be any electronic equipment or part of such electronic equipment, where the term electronic equipment includes computers, such as stationary and portable PCs, stationary and portable radio communications equipment. The term portable radio communications equipment includes mobile radio terminals such as mobile telephones, pagers, communicators, e.g. electronic organisers, smart phones, PDAs, or the like.

For example, in a cellular communications system an arrangement according to the invention may be included in a mobile terminal and/or a base station of the cellular communications system.

BRIEF DESCRIPTION OF THE FIGURES

The invention will be explained more fully below in connection with preferred embodiments and with reference to the drawings, in which.

DETAILED DESCRIPTION

Figure 1:
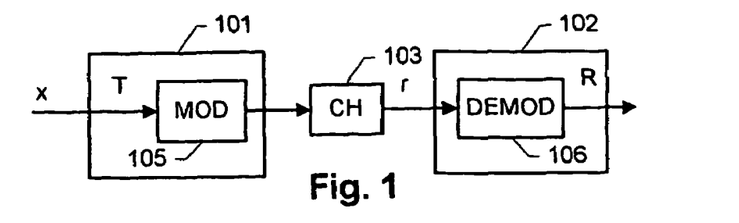
FIG. 1 schematic illustrates a general model of a communications system.

FIG. 1 schematically illustrates a general model of a communications system. The communications system comprises a transmitter 101 and a receiver 102 communicating via a communications channel 103. For example, in an actual implementation the transmitter may be a mobile terminal and the receiver a base station of a cellular radio frequency (RF) communications system or vice versa. The mobile terminal and the base station communicate with each other via communications signals transmitted over an air interface. For the purpose of the following description, the transmitter 101 is considered to comprise a modulator 105 which applies the necessary modulation to the signal so that it can be transmitted over the communications channel. The receiver comprises a demodulator 106 implementing a demodulation process corresponding to the modulation process implemented by the modulator 105, thereby allowing to recover the originally transmitted information from the received signal. In many modulation schemes, e.g. quadrature amplitude modulation (QAM) schemes, or the like, the modulation module modulates at least a part of the information to be transmitted as amplitude modulations of the transmitted signal. As mentioned above, in the example of 16-QAM modulation, when transmitting a bit stream by the transmitter, bit sequences of a predetermined length, e.g. four bits in the case of 16-QAM or, in general, $\log_2(M)$ bits in M-QAM, are encoded as a corresponding one of a number of signal symbols which may be represented as a constellation of signal points in a the I/Q plane, as illustrated by the example of FIG. 2.

Figure 2:
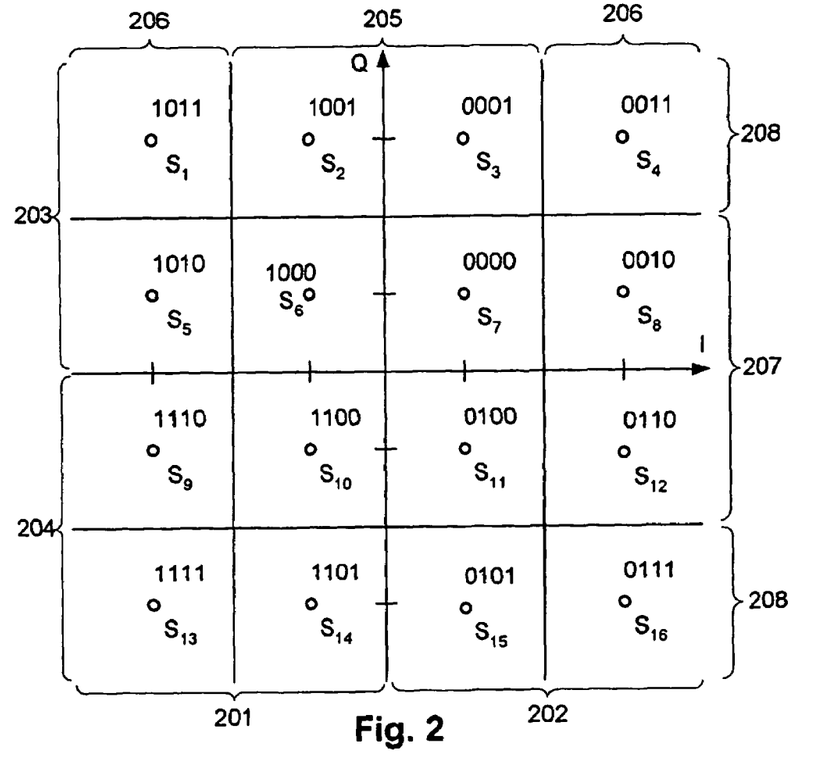
FIG. 2 shows an example of a signal constellation with 16 signal symbols.

FIG. 2 shows a signal constellation with 16 signal symbols. The signal constellation comprises M=16 signal points $S_1$ through $S_{16}$ in a two-dimensional signal space, e.g. the I/Q components in a 16-QAM signal constellation. Preferably, the signal points are distributed regularly, such that the distance to the nearest neighbours of each signal point is the same. The signal points may take values that suit the implementation in question. The example of FIG. 2 corresponds to the signal constellation proposed for the above-mentioned HSDPA. However, alternatively, other signal constellations may be chosen. In FIG. 2, 16 different bit sequences 0000 through 1111, each consisting of $\log_2(M)$=4 bits, are mapped onto the signal points $S_1$-$S_{16}$. Preferably, the mapping of the bit sequences to the signal points is chosen such that the bit sequence of each signal point only differs from those of the nearest neighbours by one bit, thereby optimising the decoding performance. For example, in FIG. 2, signal point $S_8$ has three nearest neighbours, $S_4$, $S_7$, and $S_{12}$. The bit sequence of $S_4$, i.e. 0011, differs from the sequence 0010 of $S_8$ only at bit position 4, etc. Alternatively, other mappings may be chosen.

It is noted that, in the constellation of FIG. 2, the four bits of a bit sequence may be interpreted as sign (I), sign (Q), amplitude (I), and amplitude (Q), respectively. For example, when the first bit of a bit sequence is 1, the I-component of the corresponding signal symbol is negative, i.e. the signal symbol is located in the region designated by reference numeral 201.

Otherwise, when the first bit of a bit sequence is 0, the I-component of the corresponding signal symbol is positive, i.e. the signal symbol is located in the region designated by reference numeral 202. Similarly, when the third bit of a bit sequence is 0, the amplitude of the I-component is low, i.e. the signal symbol is located in the region designated by reference numeral 205. Otherwise, when the third bit of a bit sequence is 1, the amplitude of the I-component is high, i.e. the signal symbol is located in the region designated by reference numeral 206. Similarly, the second and fourth bits can be interpreted as indicating the sign and amplitude of the O-component, respectively: When the second bit is 0, the Q-component is positive, i.e. the signal symbol is located in the region 203. When the second bit is 1, the Q-component is negative, i.e. the signal symbol is located in the region 204. When the fourth bit is 0, the Q-component is small, i.e. the signal symbol is located in the region 207. When the fourth bit is 1, the Q-component is large, i.e. the signal symbol is located in the region 208.

Hence, in the example of FIG. 2, only the third and fourth bits are related to the amplitude of the corresponding signal and, thus only the decoding of the third and fourth bits is sensitive to amplitude distortions, while the decoding of the initial two bits is not influenced by amplitude distortions. Thus, if the amplitude of the received signal is distorted, the soft values calculated for the third and fourth bit are unreliable and may, thus, cause a degraded receiver performance. It is noted that this is a property of the specific coding of the example of FIG. 2, i.e. the specific mapping of bit sequences on signal symbols. In other constellations different bits may depend on amplitude information. In yet other examples, a different number, in some examples even all, of the bits may depend on amplitude information.

Figure 3:
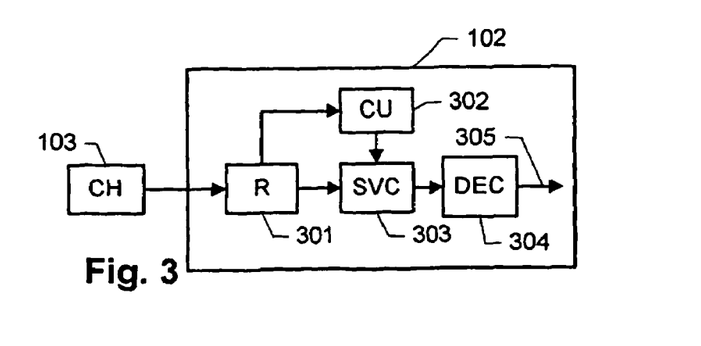
FIG. 3 shows a block diagram of a receiver according to an embodiment of the invention.

FIG. 3 schematically shows a receiver according to an embodiment of the invention. The receiver 102 receives a radio signal via a transmission channel 103. In one embodiment, the signal is a Code Division Multiple Access (CDMA) signal using a spread spectrum technique.

The receiver 102 comprises a radio receiver circuit 301 for transforming the received spread spectrum signal into a signal point r in a signal space corresponding to a modulation comprising a constellation of M signal symbols. The receiver 102 further comprises a channel decoder 304 for decoding the received signal point r, e.g. a turbo decoder, a BCJR decoder or a Viterbi decoder, etc., resulting in a decoded bit sequence 305 comprising $\log_2(M)$ bits. The decoder 304 requires soft values as an input. Hence, the receiver 102 further comprises a circuit 303 adapted to calculate soft values for the $\log_2(M)$ bits of the received signal point r and to provide the calculated soft values to the decoder 304. Decoders utilising soft values are known as such in the art of digital communications systems and will, thus, not be described in greater detail here.

For a received signal point r, the soft value calculation circuit 303 calculates soft values $L_{l,m}$ for the bits m=1, ..., $\log_2(M)$ of the l-th received signal symbol, e.g. the bits of a 16-QAM symbol. The soft values are fed to the decoder 304 together with the received radio symbols. A soft value is calculated for each bit of every received symbol. A soft value $L_{l,m}$ may be defined as $$L_{l,m} = \log \frac{P(s_{l,m}=1 \mid r)}{P(s_{l,m}=0 \mid r)} \quad (1)$$

$$= \log \frac{P(s_{l,m}=1) P(r \mid s_{l,m}=1)}{P(s_{l,m}=0) P(r \mid s_{l,m}=0)}$$

$$= \log \frac{P(r \mid s_{l,m}=1)}{P(r \mid s_{l,m}=0)}$$

where $S_{l,m}$ is the m-th bit in the l-th signal symbol represented by the transmitted signal, and $P(S_{l,m}=i \mid r)$, i=0,1, are the a posteriori probabilities of the bit $S_{l,m}$ where r is the received signal. Hence, large negative values of $L_{l,m}$ correspond to a high likelihood of bit $S_{l,m}$ being zero, while large positive values of $L_{l,m}$ correspond to a high likelihood of the bit $S_{l,m}$ being one. A value $L_{l,m}$ close to zero corresponds to an unreliable bit and, in particular, $L_{l,m}=0$ corresponds to an unreliable bit where $S_{l,m}=0$ and $S_{l,m}=1$ are equally probable.

It is noted that the second equality in eqn. (1) assumes that $S_{l,m}=1$ and $S_{l,m}=0$ are equally probable in the chosen alphabet. Otherwise, the overall ratio of probabilities should be taken into consideration in the following. However, this would only give rise to a constant factor. Hence, $L_{l,m}$ corresponds to a log-likelihood ratio of probabilities. The probabilities $P(r \mid S_{l,m}=i)$ in eqn. (1) may be written as $$P(S_{l,m}=1) = c \sum_{s_i \in 1_{l,m}} P(r, s_{l,m}) = 0, 1. \quad (2)$$

Here, $s_l$ is the l-th received symbol, $A_{l,m}=\{S_l \mid S_{l,m}=i\}$ is the set of signal symbols in the symbol constellation having the value i at bit position m, and c is a constant factor.

Hence, the calculation of the above probability involves a summation over M/2 terms each including a joint probability $P(r, S_{l,m})$. This is a computationally expensive task, especially if M is large, e.g. M=16 or even M=64.

In many applications, the above soft values $L_{l,m}$ may be approximated by $$L_{l,m} = \log \frac{\max\limits_{s_i \in A_{l,m}} P(r, s_{l,m})}{\max\limits_{s_i \in A_{o,m}} P(r, s_{l,m})} = \log \frac{P(r \mid \hat{s}_{1,l,m})}{P(r \mid \hat{s}_{0,l,m})} \quad (3)$$

where $\hat{S}_{l,m}$, i=0, 1, are the signal points that result in the largest contribution to the sums in eqn. (2). Hence, in the calculation of the probabilities, the sums over M/2 terms are approximated by the their respective dominant terms, according to $$\log \sum_{s \in A_{l,m}} P(r, s) \approx \log \max_{s \in A_{l,m}} P(r, s). \quad (4)$$

The above approximation is often referred to as the "max log MAP" approximation which yields a good approximation in cases where the above sums are dominated by one term, as for example in the case of Gaussian noise when the signal to noise ratio (SNR) is large. The above probabilities depend on the distances between the received signal r and the respective signal points. For example, in the case of additive zero-mean Gaussian noise with variance $\sigma_2$, the log-likelihood ratio of eqn. (3) may be expanded as $$L_{l,m} = \log \frac{\sigma^{-2}\exp\left(-|r-\hat{s}_{1,l,m}|^2/\sigma^2\right)}{\sigma^{-2}\exp\left(-|r-\hat{s}_{0,l,m}|^2/\sigma^2\right)} \quad (5)$$

$$= \sigma^{-2}\left(|r-\hat{s}_{0,l,m}|^2 - |r-\hat{s}_{1,l,m}|^2\right).$$

Hence, the soft value $L_{l,m}$ is approximated by the scaled difference of the squared distances to the closest signal points having opposite bit values at position m.

In a preferred embodiment, for a given bit m of a received signal symbol $S_l$, the likelihood ratio in equation (5) is obtained by first identifying the closest signal point Si, by determining the distance $\delta_1$ to that signal point and, subsequently determining the distance $\delta_2$ to the closest signal point having a bit value at position m which is different from the corresponding bit value of $S_l$. Hence, this embodiment provides a computationally inexpensive calculation of soft values.

Preferably, the closest signal point having opposite bit value than $S_l$ may be looked up in a look-up table. In another preferred embodiment, the distance to the closest signal point having opposite bit value than $S_l$ may be approximated by the known distance between $S_l$ and the closest signal point having opposite bit value than $S_l$. This distance, in turn, may be looked up in a look-up table of pre-calculated distances, thereby further reducing the computational complexity of the soft value calculation.

It is noted that, preferably, in the above estimation of the reliability values, a proper scaling of the signal points in the signal constellation should be taken into consideration, as will be described in greater detail below. However, for the purpose of the present discussion, it may be assumed that the signals in eqn. (5) are properly scaled.

According to the invention, the receiver 102 further comprises a control unit 302 which provides a reliability indication to the soft value calculation circuit 303. The reliability indication provides an indication as to whether the amplitude information of the received signal symbol r is reliable. As will be described in greater detail below, this information is used by the soft value calculation circuit in the calculation of the soft values, thereby providing an improved soft value calculation.

In general, the soft value calculation should calculate $$L_{l,m} = \log \frac{P(s_{l,m} = 1 \mid r, A)}{P(s_{l,m} = 0 \mid r, A)} \tag{6}$$

where A represents a priori amplitude information, e.g. that the receiver has entered compression. Hence $P(S_{l,m}=i|r, A)$ represents the probability of a bit value $S_{l,m}=i$, given that the signal r has been received and given the amplitude information A.

Even though the receiver may not be able to restore the distorted signal, it may improve the error rate of the decoded signal, if the receiver is aware of the distortion. For example, the error rate of the decoded signal may be measured as a Block Error Rate (BLER).

As the true distribution of A may be difficult to obtain, in some embodiments it may be useful to rely on approximations to the above equation (6). An embodiment of such an approximation will be described in greater detail below.

Figure 4:
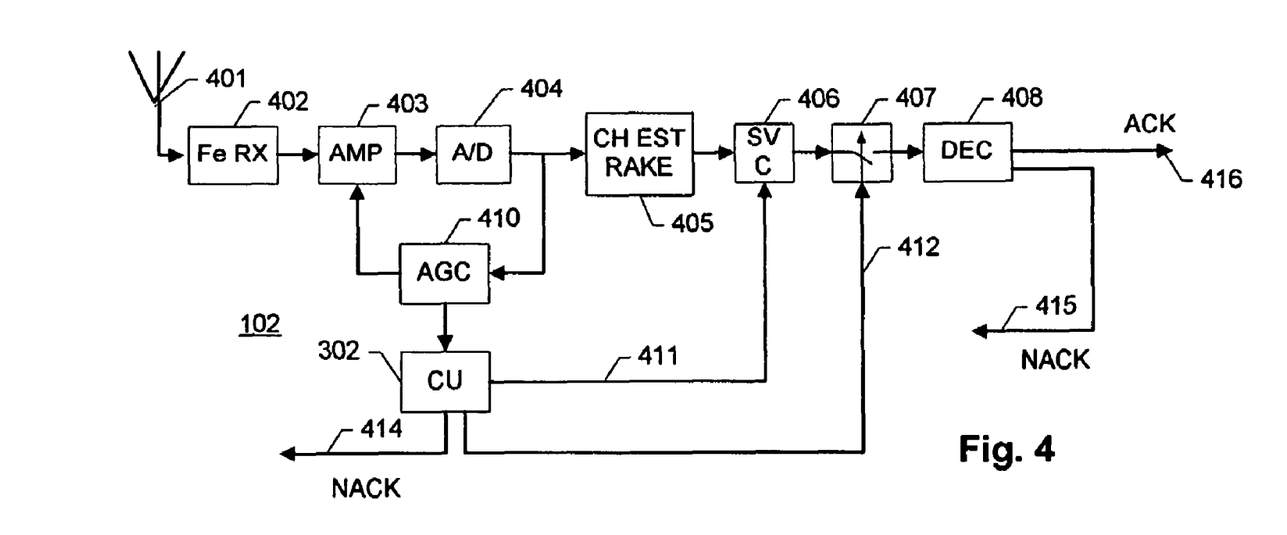
FIG. 4 shows a more detailed block diagram of a receiver according to a first embodiment of the invention.

FIG. 4 shows a more detailed block diagram of a receiver according to a first embodiment of the invention. The receiver 102 comprises an antenna 401 and a front-end receiver 402 for receiving a radio signal. The front-end receiver receives the radio signal and down-converts it to a baseband signal. The receiver 102 further comprises an amplifier 403 which receives the down-converted signal from the front-end receiver 402 and scales it in order to better utilise the dynamic range of the subsequent digital domain of the receiver. In the embodiment of FIG. 4, this is achieved by an automatic gain control circuit 410. The receiver 102 further comprises an analog-to-digital converter 404 for converting the scaled radio signal into a digital representation. The automatic gain control unit 410 receives the digital signal and controls the gain of the amplifier 403 in order to obtain a proper scaling. The scaling depends on the absolute received signal strength which, in turn, depends on the distance between the receiver and the transmitter and on the current fading situation. While the distance between the receiver and the transmitter typically varies slowly, the fading may change quite rapidly, typically on a time scale less than one slot, i.e. 0.67 ms, in WDCMA. Since an automatic gain control as such is known in the art of digital communications systems, it will not be described in greater detail here.

The receiver 102 further comprises a channel estimator and RAKE receiver 405 which receives the digital signal as an input. The RAKE receiver uses several baseband correlators to individually process several signal multipath components. The correlator outputs are combined to achieve improved communications reliability and performance (see e.g. "Digital Communications" 4th Edition, by John G. Proakis, McGraw-Hill, 2000). The RAKE receiver generates the signal symbol r to be decoded. The circuit 405 further comprises a channel estimator, e.g. implementing any suitable channel estimation technique known in the art. The channel estimator receives the digital baseband representation of the received radio signal and provides an estimate of the radio channel based on a reference or pilot channel. In one embodiment, the channel estimator identifies up to N different radio paths or channel taps $h_r=(h_{r1}, \ldots h_{rN})$. The channel estimator further provides a set of complex combiner weights $w=[w_1\ W_2\ \ldots\ W_N]$ which include a channel estimate and, in some embodiments, an interference estimate. For example, the weights may be determined according to an optimisation criterion, such as maximising the received signal to interference ratio (SIR). Typically, the channel estimate is computed on a slot basis, i.e. a channel estimate represents an average of the actual channel over one time slot.

In the following the scaling of the signal symbols is described in more detail, in order to improve readability and to describe a possible implementation. As mentioned above, in the calculation of the soft values, the signal symbols should be scaled properly. In the following it is assumed that the channel estimator estimates the channel gain on the basis of a reference or pilot channel hr which has a channel gain that may be different from the actual gain of the traffic channel, e.g. a HS-DSCH. The gain difference between the reference channel and the traffic channel may be denoted with g. Hence, the received signal r after the RAKE receiver 405 may be expressed as $$r = g w^H h_r s + n,$$

where $w^H$ is the Hermitian conjugate of w, $w^H h_r$ denotes an inner product, s is the transmitted symbol and n is a noise term, e.g. representing additive white Gaussian noise (AWGN). The gain parameter g is assumed to be signaled to the receiver, w is selected by the combiner in the receiver, and $h_r$ are the channel taps. Hence, at the receiver, the reference signal symbols $S_1 \ldots S_M$ may be scaled appropriately, according to $$S_j = g w^H h_r S_j, j=1, \ldots, M. \tag{7}$$

When this scaling is taken into consideration, the above log-likelihood ratio may be written as $$L_{l,m} = K \cdot (|\tilde{r} - \tilde{s}_{0,l,m}|^2 - |\tilde{r} - \tilde{s}_{1,l,m}|^2) \tag{8}$$

i.e. with the properly scaled signals $$\tilde{r} = \frac{r}{g w^H h_r} \tag{9}$$

$$\tilde{s}_{i,l,m} = \frac{\hat{s}_{i,l,m}}{g w^H h_r}\ m = 1, \ldots, \log_2(M), i = 0, 1,$$

and where $$K = (g w^H h_r)^2 / \sigma^2 \tag{10}$$

is a constant which depends on the signal to noise ratio.

The output of the RAKE receiver of circuit 405 is fed to the soft value calculation circuit 406 which calculates the soft values as was described in connection with eqns. (5) and (8). The calculated soft values are fed to the decoder 408 for decoding the received signal symbol into the corresponding bit sequence as described above. If the decoding is performed successfully, the decoder forwards the accepted bit sequence 416 for further processing in the receiver. Otherwise, the decoder generates a signal 415 indicating that the signal symbol could not be reliably decoded. This signal may be fed back to a transmitter circuit (not shown) causing the transmitter to return a NACK message to the transmitter that has sent the unreliable signal symbol, thereby requesting a re-transmission.

According to the invention, the receiver 102 further comprises a control unit 302 which receives information about gain changes from the automatic gain control unit 410. Based on this information, the control unit 302 determines whether any amplitude changes have occurred within a time slot. If the control unit detects such a change, it forwards this information to the soft value calculation circuit 406 which uses this information to adjust the calculated soft values accordingly.

Typically, in a digital communications system, a number of time slots are comprised in a transmission time interval (TTI), and a receiver de-interleaves and decodes the time slots of one TTI together. For example, in HSDPA the TTI length is 3 slots, i.e. three time slots are de-interleaved and decoded together.

Hence, according to the invention, the control unit 302 may detect the fraction of time slots within a TTI with unreliable amplitude information. In the embodiment of FIG. 4, the control unit detects if the fraction of soft values affected by amplitude distortions is larger than a predetermined threshold, e.g. larger than 50%. If this is the case, the corresponding signal is not forwarded to the decoder and a decoding is not even attempted, as illustrated by the switch circuit 407 controlled by the control unit 302 via control signal 412. Instead, a NACK report 414 is generated by the control unit and returned to the transmitter. It is an advantage of this embodiment that amplitude distorted TTIs may be detected at an early stage within the receiver, thereby improving the overall throughput of the receiver by avoiding futile decoding attempts.

Figure 5:
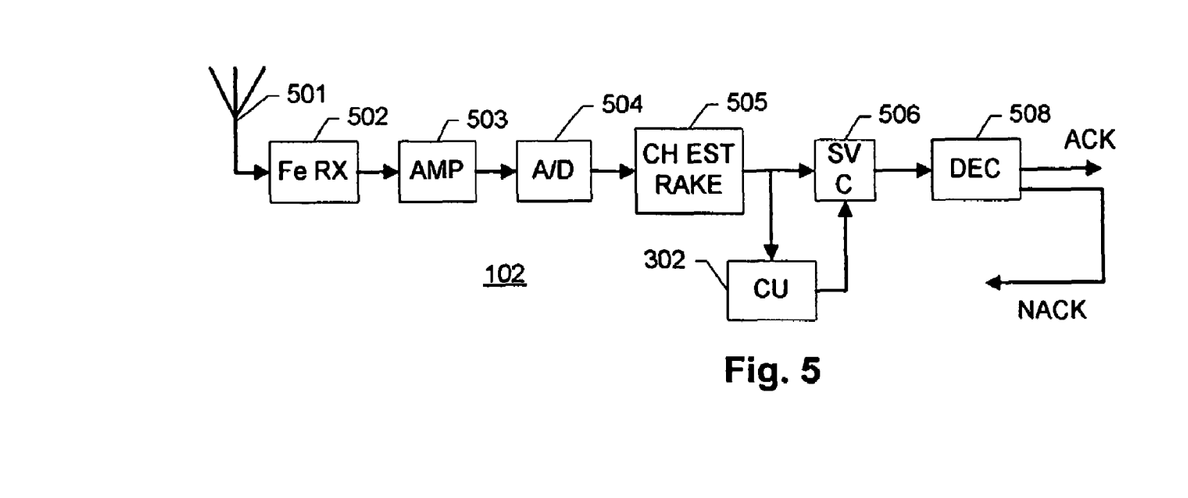
FIG. 5 shows a more detailed block diagram of a receiver according to a second embodiment of the invention.

FIG. 5 shows a more detailed block diagram of a receiver according to a second embodiment of the invention. The receiver 102 of this embodiment comprises an antenna 501, a front-end receiver 502, an amplifier 503, and A/D converter 504, a channel estimator and RAKE receiver 505, a soft value calculation circuit 506 and a decoder 508. The above components correspond to the respective components described in connection with the embodiment of FIG. 4.

According to this embodiment, the receiver comprises a control unit 302 which receives the output of the RAKE receiver and determines changes in the amplitude, e.g. based on the channel estimate of the channel estimator.

For example, in one embodiment quantization effects are treated in the combiner of the RAKE receiver 505 by using a time-varying scaling. The change of the scaling leads to temporary amplitude distortions. Hence, since information about this change of scaling is available from the receiver, this information can be used by the control circuit 302 to adjust the calculated soft values for affected bits.

As described above, the control unit 302 feeds the determined information about amplitude distortions to the soft value calculation circuit 506 where it is used to adjust the calculated soft values.

Figure 6:
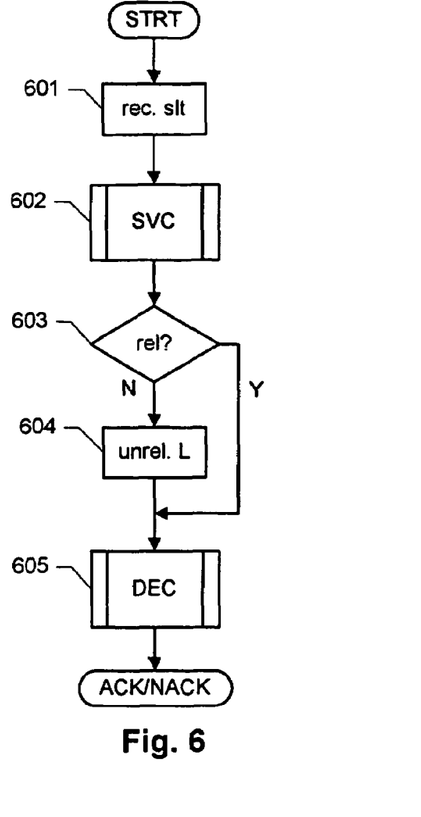
FIG. 6 shows a flow diagram of a method according to an embodiment of the invention.

FIG. 6 shows a flow diagram of a method according to an embodiment of the invention. In the following description reference will also be made to the block diagram of FIG. 5. In step 601, a slot comprising transmitted data is received. In step 602, the soft values are calculated, e.g. as described in connection with eqn. (5). In step 603, the control unit 302 detects whether the received amplitude information is reliable. If yes, the process continues at step 605. If not, the process continues at step 604 where the soft values that are affected by the detected amplitude distortion are adjusted before proceeding at step 605. For example the soft values may be multiplied by a scaling factor $0 \leq \eta < 1$, e.g. $\eta = 0.1$, thereby reducing the absolute value of the soft values. At step 605, the signal is decoded on the basis of the calculated soft values, resulting in an acceptance of the received symbol as reliable or, if the decoding step failed, a rejection of the symbol as unreliable.

Figure 7:
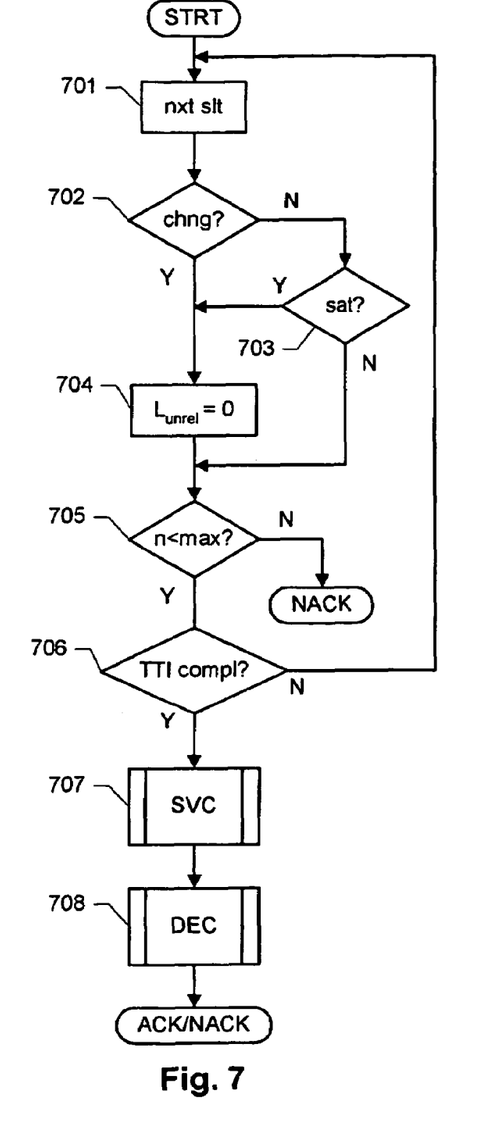
FIG. 7 shows a flow diagram of a method according to another embodiment of the invention.

FIG. 7 shows a flow diagram of a method according to another embodiment of the invention. The flow diagram of FIG. 7 illustrates the decoding of signal symbols received within a transmission time interval comprising a number of time slots. In the following description reference will also be made to the block diagram of FIG. 4. In step 701, the next slot of a transmission time interval is received. In step 702, it is detected whether, during the current time slot, a change in gain settings of the amplifier 403 has taken place caused by the gain control unit 410. This may be detected by comparing the times at which gain changes are caused by the gain control circuit with the slot boundaries. If a change in gain has taken place, the process proceeds at step 704 where the soft values which are affected by amplitude distortions are set to zero. For example, in the symbol constellation of FIG. 2, the effected soft values are the soft values $L_{l,3}$ and $L_{l,4}$ of the third and fourth bit of a symbol, respectively. Hence, even though the actual distributions in eqn. (6) may not be known or at least difficult to compute, the above approach provides a simple approximation which has proven useful in a receiver as shown in FIG. 4.

If no change has taken place, it is detected, in step 703, whether the amplifier has reached saturation. If this is the case, the amplitude information is considered unreliable as well and the process proceeds at step 704. Otherwise, no adjustment of the soft values is performed and the process continues at step 705.

At step 705, it is determined whether the total number of soft values affected within the current transmission time interval has reached a predetermined threshold, e.g. 50% of all soft values. If this is the case, the receiver generates a NACK report and terminates processing of the time slots of the current transmission time interval without attempting to decode any of the corresponding signal symbols.

Otherwise, the process proceeds at step 706, where it is determined whether all time slots of the current transmission time interval have been received. If not, the process returns to step 701 and processes the next time slot.

If all time slots of a transmission time interval have been received and the transmission time interval has not been rejected in step 705, the soft values of the unaffected bits, i.e. the soft values which have not been set to zero, are calculated in step 707, as was described in connection with eqns. (5) and (8).

Subsequently, the process proceeds at step 708 where the signal symbols of the current transmission time interval are decoded as described above, resulting in an acceptance or a rejection of the decoded signal.

Figure 8:
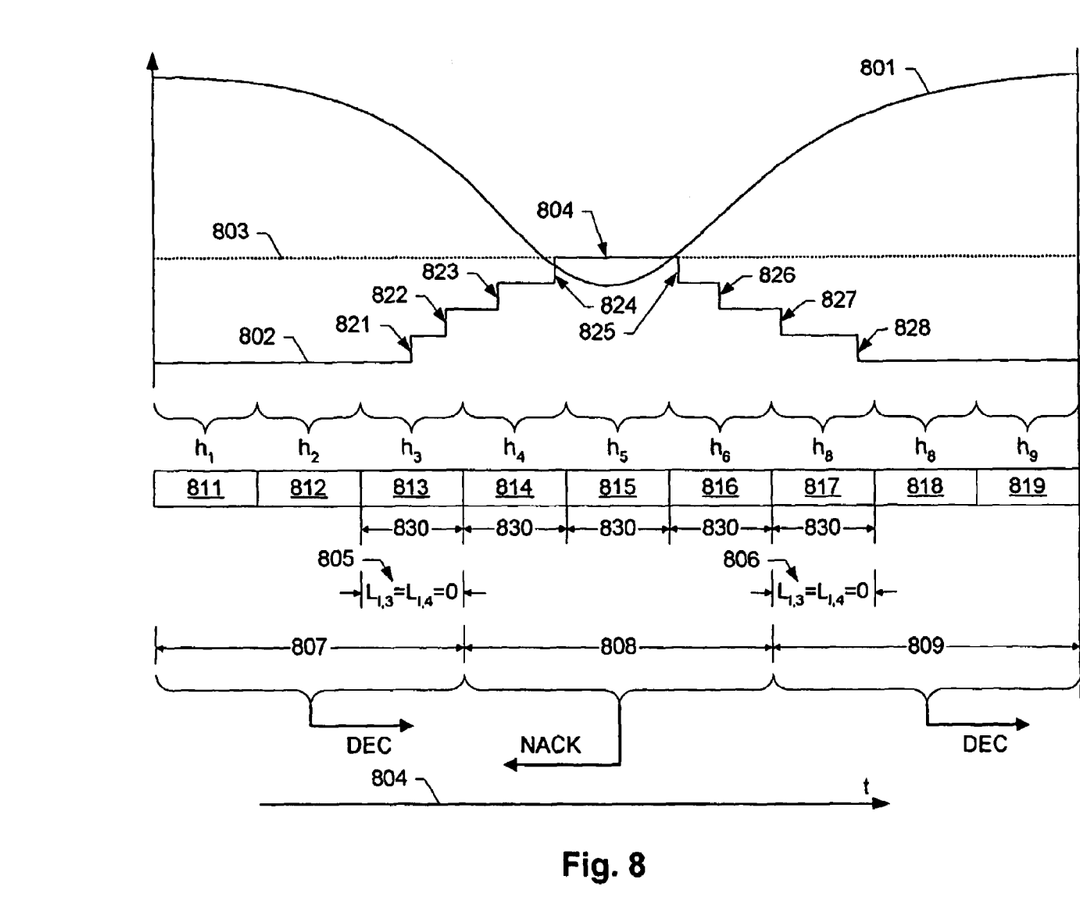
FIG. 8 illustrates the method of FIG. 7 with reference to an example of a received communications signal.

FIG. 8 illustrates the method of FIG. 7 with reference to an example of a communications signal. FIG. 8 illustrates a received signal corresponding to a time frame comprising 9 time slots 811, 812, 813, 814, 815, 816, 817, 818, and 819. In FIG. 8, it is assumed that a transmission time interval comprises 3 time slots, as in HSDPA, and that the received signal is modulated according to 16-QAM with a signal constellation as illustrated in FIG. 2. Hence, the depicted frame comprises TTIs 807, 808, and 809. The received signal strength is indicated by the solid line 801. Hence, in the example of FIG.

8, the signal strength is assumed to decrease towards the middle of the frame and to increase again towards to end of the frame. Hence, in this example, the amplitude varies considerably on a time scale corresponding to a TTI, in particular during TTI 808. As mentioned above, such a change in amplitude may be caused by a change in the fading situation.

As described above, in the receiver the above amplitude changes cause the gain settings in the amplifier to change, e.g. by a gain control circuit as described in connection with FIG. 4. Line 802 illustrates the gain setting corresponding to the received signal 801 and, in particular, changes in the gain settings indicated by reference numerals 821, 822, 823, 824, 825, 826, 827, and 828. Hence, during time slots 813, 814, 816, and 817, the gain is changed. In FIG. 8 it is further assumed that the channel is estimated once per time slot using standard averaging, resulting in channel estimates $h_1$, $h_2$, $h_3$, $h_4$, $h_5$, $h_6$, $h_7$, $h_8$, and $h_9$.

The dotted line 803 illustrates the maximum gain level of the amplifier. In the example, of FIG. 8, it is assumed that during TTI 808, the gain reaches the maximum level as indicated by reference numeral 804. This situation is likewise detected by the control unit 302 of FIG. 4 and results in the time slot 815 to be marked unreliable as well.

Hence, the time slots 813, 814, 815, 816, and 817 are affected by amplitude distortions, as indicated by reference numeral 830.

In TTI 807, only the last time slot, i.e. time slot 813 is affected by the amplitude distortions. According to the method of FIG. 7, the corresponding affected soft values are set to zero, i.e. assuming the constellation of FIG. 2 the soft values $L_{l,3}$ and $L_{l,4}$, as indicated by reference numeral 805. Hence, in this example, ⅓ or the time slots of the TTI 807 are affected and ⅙ of the soft values. Likewise, in TTI 809, only the first time slot, i.e. time slot 817 is affected by the amplitude distortions and, accordingly, the soft values $L_{l,3}$ and $L_{l,4}$, of time slot 817 are set to zero as indicated by reference numeral 806. Again ⅓ or the time slots of the TTI 809 are affected and ⅙ of the soft values.

In the TTI 808, on the other hand. i.e. the TTI where the fading dip of the signal strength 801 is most pronounced, all time slots are affected by amplitude distortions causing 50% of the soft values of TTI 808 to be distorted. According to the method of FIG. 7, the control unit 302 of FIG. 4 may detect this situation prior to the decoding of the corresponding signal, and has the possibility of triggering a NACK report without starting the decoding process.

It is noted that the invention was described in connection with soft values defined as a log-likelihood ratio indicating a reliability value for the bit values of a received sequence.

However, other definitions of likelihood values may be used within the scope of the invention.

It is further noted that the signal constellation of FIG. 2 is merely used as an example. The calculation of soft values according to the invention is not limited to this signal constellation.

In general, it is noted that the above-mentioned embodiments illustrate rather than limit the invention, and that those skilled in the art will be able to design many alternative embodiments without departing from the scope of the appended claims, e.g. the skilled person may combine features illustrated in connection with individual embodiments.

What is claimed is:

1. A method of decoding a communications signal in a digital communications system, wherein the communications signal is modulated according to a modulation scheme including amplitude information, the method comprising:

receiving a communications signal by a receiver modules;

generating a likelihood value for a received communications signal, wherein the step of generating the likelihood value further comprises generating the likelihood value on the basis of the provided reliability indication of the amplitude information, wherein the reliability indication is provided by the receiver module;

decoding the communications signal based on at least the generated likelihood value; and providing a reliability indication of the amplitude information conveyed by the received communications signal.

2. The method according to claim 1, wherein the step of receiving the communications signal further comprises scaling the communications signal by an amplifier and the step of providing the reliability indication by the receiver module comprises generating the reliability indication on the basis of a gain setting of said amplifier.

3. The method according to claim 1, wherein the communications signal is modulated according to a quadrature amplitude modulation scheme.

4. A method of decoding a communications signal in a digital communications system, wherein the communications signal is modulated according to a modulation scheme including amplitude information, the method comprising generating a likelihood value for a received communications signal, wherein the step of generating the likelihood value further comprises generating the likelihood value on the basis of the provided reliability indication of the amplitude information, the step of generating the likelihood value on the basis of the provided reliability indication further comprising determining whether an amplitude change by a predetermined magnitude has occurred within a predetermined time period;

decoding the communications signal based on at least the generated likelihood value; and providing a reliability indication of the amplitude information conveyed by the received communications signal.

5. The method according to claim 4, wherein the predetermined time period corresponds to a time slot for communicating a bit sequence.

6. A method of decoding a communications signal in a digital communications system, wherein the communications signal is modulated according to a modulation scheme including amplitude information, the method comprising generating a likelihood value for a received communications signal, wherein the step of generating the likelihood value further comprises generating the likelihood value on the basis of the provided reliability indication of the amplitude information wherein the step of generating the likelihood value on the basis of the provided reliability indication of the amplitude information further comprises adjusting the likelihood value to a value corresponding to higher uncertainty of a predetermined bit value if an amplitude change has occurred and if said bit value is encoded using amplitude information;

decoding the communications signal based on at least the generated likelihood value; and providing a reliability indication of the amplitude information conveyed by the received communications signal.

7. A method according to claim 6, wherein the modulation scheme is 16-QAM wherein each signal symbol comprises four bits and where two predetermined bits of said four bits depend on amplitude information; and the method further comprises adjusting the likelihood values of said two predetermined bits to a value corresponding to higher uncertainty, if a change in amplitude is detected during the time slot for communicating said four bit sequence.

8. A method of decoding a communications signal in a digital communications system, wherein the communications signal is modulated according to a modulation scheme including amplitude information, the method comprising
generating a likelihood value for a received communications signal, wherein the step of generating the likelihood value further comprises generating the likelihood value on the basis of the provided reliability indication of the amplitude information;
decoding the communications signal based on at least the generated likelihood value;
providing a reliability indication of the amplitude information conveyed by the received communications signal; and
rejecting all received signal symbols received within a time interval comprising a predetermined number of consecutive slots, if a change in amplitude by a predetermined magnitude is detected in more than a predetermined fraction of slots of said number of consecutive slots.

9. A method of decoding a communications signal in a digital communications system, wherein the communications signal is modulated according to a modulation scheme including amplitude information, the method comprising
generating a likelihood value for a received communications signal, wherein the step of generating the likelihood value further comprises generating the likelihood value on the basis of the provided reliability indication of the amplitude information;
decoding the communications signal based on at least the generated likelihood value; and
providing a reliability indication of the amplitude information conveyed by the received communications signal, wherein the communications signal is a communications signal of a High Speed Downlink Packet Access of a 3GPP Wideband Code Division Multiple Access.

10. An arrangement for decoding a communications signal in a digital communications system, where the communications signal is modulated according to a modulation scheme including amplitude information, the arrangement comprising:
a receiver module for receiving the communications signal;
processing means adapted to generate a likelihood value for a received communications signal, wherein the processing means is further adapted to generate the likelihood value on the basis of the provided reliability indication of the amplitude information, the receiver module being adapted to provide the reliability indication;
a decoder for decoding the communications signal based on at least the generated likelihood value; and
means for providing a reliability indication of the amplitude information conveyed by the received, communications signal.

11. The arrangement according to claim 10, wherein the arrangement further comprises an amplifier for scaling the received communications signal; and wherein the receiver module is further adapted to generate the reliability indication on the basis of a gain setting of said amplifier.

12. The arrangement according to claim 10, wherein the communications signal is modulated according to a quadrature amplitude modulation scheme.

13. The arrangement according to claim 10, as implemented in a cellular communications system.

14. The arrangement according to claim 10, wherein the arrangement is comprised in a mobile terminal of the cellular communications system.

15. The arrangement according to claim 10, wherein the arrangement is comprised in a base station of the cellular communications system.

16. The arrangement according to claim 10, as implemented in a device for receiving a communications signal.

17. The arrangement according to claim 16, wherein the device further comprises a decoder adapted to receive an input signal from the arrangement indicative of the determined reliability value.

18. The arrangement according to claim 16 wherein the device is a mobile terminal.

19. An arrangement for decoding a communications signal in a digital communications system, where the communications signal is modulated according to a modulation scheme including amplitude information, the arrangement comprising:
processing means adapted to generate a likelihood value for a received communications signal, wherein the processing means is further adapted to generate the likelihood value on the basis of the provided reliability indication of the amplitude information wherein the processing means is further adapted to determine whether an amplitude change by a predetermined magnitude has occurred within a predetermined time period;
a decoder for decoding the communications signal based on at least the generated likelihood value; and
means for providing a reliability indication of the amplitude information conveyed by the received, communications signal.

20. The arrangement according to claim 19, wherein the predetermined time period corresponds to a time slot for communicating a bit sequence.

21. An arrangement for decoding a communications signal in a digital communications system, where the communications signal is modulated according to a modulation scheme including amplitude information, the arrangement comprising:
processing means adapted to generate a likelihood value for a received communications signal, wherein the processing means is further adapted to generate the likelihood value on the basis of the provided reliability indication of the amplitude information wherein the processing means is further adapted to adjust the likelihood value to a value corresponding to higher uncertainty of a predetermined bit value if an amplitude change has occurred and if said bit value is encoded using amplitude information;
a decoder for decoding the communications signal based on at least the generated likelihood value; and
means for providing a reliability indication of the amplitude information conveyed by the received, communications signal.

22. The arrangement according to claim 21, wherein the modulation scheme is 16-QAM wherein each signal symbol comprises four bits and where two predetermined bits of said four bits depend on amplitude information; and the processing means is further adapted to adjust the likelihood values of said two predetermined bits to a value corresponding to higher uncertainty, if a change in amplitude is detected during the time slot for communicating said four bit sequence.

23. An arrangement for decoding a communications signal in a digital communications system, where the communications signal is modulated according to a modulation scheme including amplitude information, the arrangement comprising:
processing means adapted to generate a likelihood value for a received communications signal, wherein the processing means is further adapted to generate the likelihood value on the basis of the provided reliability indication of the amplitude information, wherein the processing means is further adapted to reject all received signal symbols received within a time interval comprising a predetermined number of consecutive slots, if a change in amplitude by a predetermined magnitude is detected in more than a predetermined fraction of slots of said number of consecutive slots;

a decoder for decoding the communications signal based on at least the generated likelihood value;

means for providing a reliability indication of the amplitude information conveyed by the received, communications signal.

24. An arrangement for decoding a communications signal in a digital communications system, where the communications signal is modulated according to a modulation scheme including amplitude information, the arrangement comprising:

processing means adapted to generate a likelihood value for a received communications signal, wherein the processing means is further adapted to generate the likelihood value on the basis of the provided reliability indication of the amplitude information;

a decoder for decoding the communications signal based on at least the generated likelihood value; and means for providing a reliability indication of the amplitude information conveyed by the received, communications signal, wherein the communications signal is a communications signal of a High Speed Downlink Packet Access of a 3GPP Wideband Code Division Multiple Access.

25. The arrangement according to claim 10, further comprising:

a receiver for receiving a communication signal;

an amplifier for scaling the received communications signal according to a predetermined amplifier gain;

a gain control module for controlling the amplifier gain according to a received signal strength, the gain control module being adapted to feed a gain control signal to the amplifier; and a control unit for generating amplitude information, the control unit being adapted to receive the gain control signal from the gain control unit and to generate an amplitude information signal; and that the processing means is adapted to receive the amplitude information signal from the control unit.

* * * * *

UNITED STATES PATENT AND TRADEMARK OFFICE
CERTIFICATE OF CORRECTION

| | |
|---|---|
| PATENT NO. | : 7,583,760 B2 |
| APPLICATION NO. | : 10/535479 |
| DATED | : September 1, 2009 |
| INVENTOR(S) | : Bernhardsson et al. |

It is certified that error appears in the above-identified patent and that said Letters Patent is hereby corrected as shown below:

On Title Page 2, in Item (56), under "OTHER PUBLICATIONS", in Column 2, Line 2, delete "Hybird ARQ" and insert -- Hybrid ARQ --, therefor.

In Column 1, Line 63, delete "comprising" and insert -- comprising: --, therefor.

In Column 2, Line 4, delete "signal ;" and insert -- signal; --, therefor.

In Column 2, Line 42, delete "amplifier" and insert -- amplifier; --, therefor.

In Column 4, Line 30, delete "comprising" and insert -- comprising: --, therefor.

In Column 4, Line 56, delete "comprises" and insert -- comprises: --, therefor.

In Column 5, Line 35, delete "schematic" and insert -- schematically --, therefor.

In Column 6, Line 53, delete "O-componcnt;" and insert -- Q-component; --, therefor.

In Column 7, Line 45, delete "$S_{l,m}$" and insert -- $s_{l,m}$ --, therefor.

In Column 7, Line 46, delete "$P(S_{l,m}=il\ r)$," and insert -- $P(s_{l,m}=i|r)$, --, therefor.

In Column 7, Line 47, delete "$S_{l,m}$" and insert -- $s_{l,m}$ --, therefor.

In Column 7, Line 49, delete "$S_{l,m}$" and insert -- $s_{l,m}$ --, therefor.

In Column 7, Line 50, delete "$S_{l,m}$" and insert -- $s_{l,m}$ --, therefor.

In Column 7, Line 53, delete "$S_{l,m}=0$ and $S_{l,m}=1$" and insert -- $s_{l,m}=0$ and $s_{l,m}=1$ --, therefor.

Signed and Sealed this
First Day of November, 2011

David J. Kappos
*Director of the United States Patent and Trademark Office*

CERTIFICATE OF CORRECTION (continued)
U.S. Pat. No. 7,583,760 B2

In Column 7, Line 55, delete "$S_{l,m}=0$ and $S_{l,m}=0$" and insert -- $s_{l,m}=0$ and $s_{l,m}=1$ --, therefor.

In Column 7, Line 60, delete "P (r|$S_{l,m}$=i)" and insert -- P(r|$s_{l,m}$=i) --, therefor.

In Column 7, Line 64, in Equation (2), delete "$$P(S_{l,m}=1)=c\sum_{s \in A_{l,m}} P(r,s_{l,m})=0,1.$$"

and insert -- $$P\left(r|s_{l,m}=i\right)=c\sum_{s_l \in A_{i,m}} P\left(r|s_{l,m}\right), \quad i=0,1.$$ --, therefor.

In Column 8, Line 1, delete "$A_{l,m}=\{S_l|S_{l,m}=i\}$" and insert -- $A_{i,m}=\{s_l|s_{l,m}=i\}$ --, therefor.

In Column 8, Line 6, delete "P (r,$S_{l,m}$)." and insert -- P(r,$s_{l,m}$). --, therefor.

In Column 8, Lines 11-15, in Equation (3), delete "$$L_{l,m}=\log\frac{\max_{s_i \in A_{1,m}} P(r,s_{l,m})}{\max_{s_i \in A_{0,m}} P(r,s_{l,m})}=\log\frac{P(r|\hat{s}_{1,l,m})}{P(r|\hat{s}_{0,l,m})}$$"

and insert -- $$L_{l,m}=\log\frac{\max_{s_l \in A_{1,m}} P\left(r,s_{l,m}\right)}{\max_{s_l \in A_{0,m}} P\left(r,s_{l,m}\right)}=\log\frac{P\left(r,\hat{s}_{1,l,m}\right)}{P\left(r,\hat{s}_{0,l,m}\right)}$$ --, therefor.

In Column 8, Line 19, delete "$\hat{S}_{l,m}$, i=0," and insert -- $\hat{s}_{i,l,m}$, i=0, --, therefor.

In Column 8, Line 22, after "by" delete "the".

In Column 8, Line 26, in Equation (4)d delete "$$\log\sum_{s \in A_{l,m}} P(r,s) \approx \log\max_{s \in A_{l,m}} P(r,s)$$"

and insert -- $$\log\sum_{s \in A_{i,m}} P(r,s) \approx \log\max_{s \in A_{i,m}} P(r,s)$$ --, therefor.

In Column 8, Line 37, delete "$\sigma_2$," and insert -- $\sigma^2$, --, therefor.

In Column 8, Line 51, delete "$S_l$," and insert -- $s_l$, --, therefor.

In Column 8, Line 52, delete "Si," and insert -- $s_l$, --, therefor.

In Column 8, Line 56, delete "$S_l$." and insert -- $s_l$. --, therefor.

In Column 8, Line 60, delete "$S_l$" and insert -- $s_l$ --, therefor.

CERTIFICATE OF CORRECTION (continued)
U.S. Pat. No. 7,583,760 B2

In Column 8, Line 62, delete "$S_l$" and insert -- $s_l$ --, therefor.

In Column 8, Line 63, "$S_l$" and insert -- $s_l$ --, therefor.

In Column 8, Line 64, delete "$S_l$." and insert -- $s_l$. --, therefor.

In Column 9, Line 25, delete "P ($S_{l,m}$=i|r," and insert -- P($s_{l,m}$=i|r, --, therefor.

In Column 9, Line 26, delete "$S_{l,m}$=i," and insert -- $s_{l,m}$=i, --, therefor.

In Column 9, Line 58, delete "WDCMA." and insert -- WCDMA. --, therefor.

In Column 10, Lines 11-12, delete "w=[$w_1$ $W_2$ ... $W_N$]" and insert -- w=[$w_1$ $w_2$ ... $w_N$] --, therefor.

In Column 10, Line 25, delete "hr" and insert -- $h_r$ --, therefor.

In Column 10, Line 33, delete "$w^H$hr" and insert -- $w^H h_r$ --, therefor.

In Column 10, Line 42, in Equation (1), delete "$S_j$=g$w^H h_r S_j$, =1,..., M." and insert -- $\hat{S}_j$=g$w^H h_r S_j$, j=1,..., M. --, therefor.

In Column 10, Line 46, in Equation (8), delete "$L_{l,m} = K \cdot (|\tilde{r} - \tilde{s}_{0,l,m}|^2 - |\tilde{r} - \tilde{s}_{1,l,m}|^2)$," and insert -- $L_{l,m} = K \cdot (|\tilde{r} - \tilde{s}_{0,l,m}|^2 - |\tilde{r} - \tilde{s}_{1,l,m}|^2)$ --, therefor.

In Column 12, Line 3, delete "example" and insert -- example, --, therefor.

In Column 12, Lines 21-30, delete "If a change in.......in FIG. 4." and insert the same in line 22, as a new paragraph.

In Column 13, Line 39, delete "hand." and insert -- hand, --, therefor.

In Column 13, Lines 50-51, delete "However, other.......the invention." and insert the same in line 49, after "a received sequence." as a continuation of the paragraph.

In Column 13, Line 67, in Claim 1, delete "modules;" and insert -- module; --, therefor.